US009008094B2

(12) United States Patent
Kim et al.

(10) Patent No.: US 9,008,094 B2
(45) Date of Patent: Apr. 14, 2015

(54) DATA TRANSMISSION AND RECEPTION METHOD AND APPARATUS ROBUST AGAINST PHASE NOISE FOR HIGH EFFICIENCY SATELLITE TRANSMISSION

(75) Inventors: Pansoo Kim, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 13/613,272

(22) Filed: Sep. 13, 2012

(65) Prior Publication Data

US 2013/0077563 A1 Mar. 28, 2013

(30) Foreign Application Priority Data

Sep. 27, 2011 (KR) ........................ 10-2011-0097857
Jul. 10, 2012 (KR) ........................ 10-2012-0074998

(51) Int. Cl.
*H04L 12/28* (2006.01)
*H04B 7/185* (2006.01)

(52) U.S. Cl.
CPC ................................. *H04B 7/18513* (2013.01)

(58) Field of Classification Search
USPC ................... 370/392, 474; 375/229, 260, 267
See application file for complete search history.

(56) References Cited

U.S. PATENT DOCUMENTS 3,806,918 A * 4/1974 Cauthron et al. ............... 341/70
6,757,865 B1 * 6/2004 Nakamura et al. ............ 714/796
7,593,490 B2 9/2009 Alagha et al.
8,049,983 B1 * 11/2011 Han et al. ........................ 360/51
8,111,765 B2 * 2/2012 Kodama et al. ............... 375/260
2002/0154620 A1 * 10/2002 Azenkot et al. ............... 370/347
2004/0104721 A1 * 6/2004 Aratani et al. ................ 324/210
2006/0045137 A1 * 3/2006 Kim et al. ..................... 370/516
2007/0263712 A1 11/2007 Ling et al.
2008/0298382 A1 * 12/2008 Galli et al. .................... 370/438
2008/0310560 A1 12/2008 Kim et al.
2009/0310699 A1 * 12/2009 Kodama et al. ............... 375/267

FOREIGN PATENT DOCUMENTS

KR 10-0636373 B1 10/2006
KR 10-0964003 B1 6/2010

OTHER PUBLICATIONS

Pansoo Kim et al; "Robust carrier recovery for DVB-S2 system", ICT Convergence (ICTC), 2011, pp. 676-680, Sep. 28-30, 2011.
Alan Barbieri, et al; "On Pilot-Symbol-Assisted Carrier Synchronization for DVB-S2 Systems", IEEE Transactions on Broadcasting, vol. 53, No. 3, Sep. 2007, pp. 685-692.

* cited by examiner

*Primary Examiner* — Phuc Tran
(74) *Attorney, Agent, or Firm* — Ladas & Parry LLP

(57) ABSTRACT

A data transmission and reception apparatus is used for a high efficiency satellite transmission. The apparatus includes an initial phase calculation unit to calculate initial phase information using a preamble and a postamble of a data packet applied thereto, a symbol transition calculation unit to perform forward and backward metric operations using the initial phase information calculated by the initial phase calculation unit and a pilot symbol in the data packet to calculate a symbol transition of the data packet, and a phase error estimation unit to calculating a phase error using the pilot symbol in a spot where the pilot symbol is positioned, the calculated phase error being provided to the symbol transition calculation unit.

15 Claims, 7 Drawing Sheets

START
CALCULATE START POINT AND END POINT OF INITIAL PHASE ~ S900
CALCULATE FORWARD METRIC AND BACKWARD METRIC OF INITIAL PHASE ~ S902
ESTIMATE PHASE ERROR ~ S904
END

| PREAMBLE (Unique Word) | USER DATA |
|---|---|

DATA TRANSMISSION AND RECEPTION METHOD AND APPARATUS ROBUST AGAINST PHASE NOISE FOR HIGH EFFICIENCY SATELLITE TRANSMISSION

RELATED APPLICATION(S)

This application claims the benefit of Korean Patent Application Nos. 10-2011-0097857 and 10-2012-0074998, filed on Sep. 27, 2011 and Jul. 10, 2012, respectively, which are hereby incorporated by reference as if fully set forth herein.

FIELD OF THE INVENTION

The present invention relates to a satellite transmission system, and more particularly, to a data transmission and reception apparatus and method robust against phase noise for a high efficiency satellite transmission in a time division multiplexing (TDM)/time division multiple access (TDMA) satellite transmission and access system.

BACKGROUND OF THE INVENTION

In general, a TDM/TDMA scheme is mainly used as a transport protocol in a conventional broadband satellite broadcast/communication system. In case of a broadcast system, data is transmitted in the form of a continuous stream based on a TDM scheme, and a start point of a frame is detected on a basis of known data (unique data) at a reception end and data due to a satellite channel error is restored based on the detected start point of the frame.

FIG. 1 illustrates a satellite broadcast communication network of the related art. As illustrated in FIG. 1, a forward link from a gate way 100 to users 104, 106, and 108 uses a satellite broadcast channel, and a reverse link from the users 104, 106, and 108 to the gateway uses a short burst packet of TDMA type.

As illustrated in FIG. 2, a packet is composed of elongated preamble data, which is used for detecting a burst start point and estimating a channel error, and user data, which is data information. Such a packet is excellent for detecting a start point of data. However, as shown in FIG. 3, in the occurrence of a channel error having an irregular random variable such as time variable carrier phase noise, when the channel error is estimated in the preamble and subsequently compensated for in a data section, an estimate error occurs, which causes a problem that data is not properly restored.

In addition, in order to address this problem, carrier phase noise is obtained at a reception end with respect to all possible data streams and then data is restored using the same, which entails an increase of computational complexity at the reception end.

SUMMARY OF THE INVENTION

In view of the above, therefore, the present invention provides a data transmission and reception apparatus and method robust against phase noise for a high efficiency satellite transmission in a TDM/TDMA type satellite transmission and access system.

In accordance with an aspect of the present invention, there is provided a data transmission and reception apparatus for a high efficiency satellite transmission, which includes: an initial phase calculation unit configured to calculate initial phase information using a preamble and a postamble of a data packet applied thereto; a symbol transition calculation unit configured to perform forward and backward metric operations using the initial phase information calculated by the initial phase calculation unit and a pilot symbol in the data packet to calculate a symbol transition of the data packet; and a phase error estimation unit configured to calculating a phase error using the pilot symbol in a spot where the pilot symbol is positioned, the calculated phase error being provided to the symbol transition calculation unit.

In the data transmission and reception apparatus, the initial phase information is phase information of a start point and an end point of the initial phase of the data packet.

In accordance with another aspect of the present invention, there is provided a data transmission and reception method for a high efficiency satellite transmission, which includes: calculating initial phase information using a preamble and a postamble of a data packet; performing forward and backward metric operations using the initial phase information and a pilot symbol of the data packet; and calculating a symbol transition of the data packet through the forward and backward metric operations.

In the data transmission and reception method, the performing forward and backward metric operations include calculating a phase error using the pilot symbol in the data packet in a spot where the pilot symbol is positioned.

In the data transmission and reception method, the initial phase information is phase information of a start point and an end point of the initial phase of the data packet.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, embodiments of the present invention will be described in detail with the accompanying drawings.

In a satellite broadcast/communication system, a signal transmission and reception model may be expressed by Eq. (1) below:

$$r_k = s_k e^{j\theta_k} + nk,$$

$$\text{where } k=0, \ldots, P-1 \qquad \text{Eq. (1)}$$

In Equation, when a channel carrier phase is considered as k index of a time domain, $\theta_k$ may be considered as a random variable having a uniform distribution of a time variable function $(-\pi, \pi)$. Herein, r is a reception signal vector, s is a transmission signal vector, and n is expressed as P number of vectors corresponding to AWGN noise.

In this case, a phase locked loop (PLL) scheme has been mainly used a method of tracking a change in phase noise.

Figure 4:
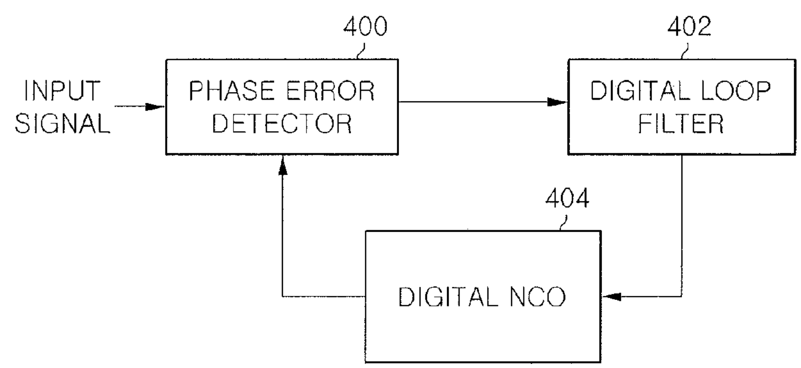
FIG. 4 is a block diagram of a PLL for phase synchronization in accordance with the related art.

FIG. 4 is a block diagram of a PLL for phase synchronization in accordance with the related art.

In the case of the PLL scheme, compensation for phase noise is performed through a tracking of a phase variation by optimizing a gain value of a digital loop filter 402 pursuant to a signal to noise ratio (SNR) in Eq. (2) below. However, it has a limitation in perfectly correcting the phase noise when a distance between adjacent symbols, such as higher order modulation (8PSK, 16QAM) or the like, is close. In Eq. (2), $\hat{\theta}_{k+1}$ corresponds to an output from the digital loop filter 402, $x_k$ is an output signal from a phase error detector 400, and $\lambda$ is a value set by a user as a gain value of the digital loop filter 402.

$$\hat{\theta}_{k+1}=\hat{\theta}_k+\lambda x_k \quad \text{Eq. (2)}$$

Figure 5:
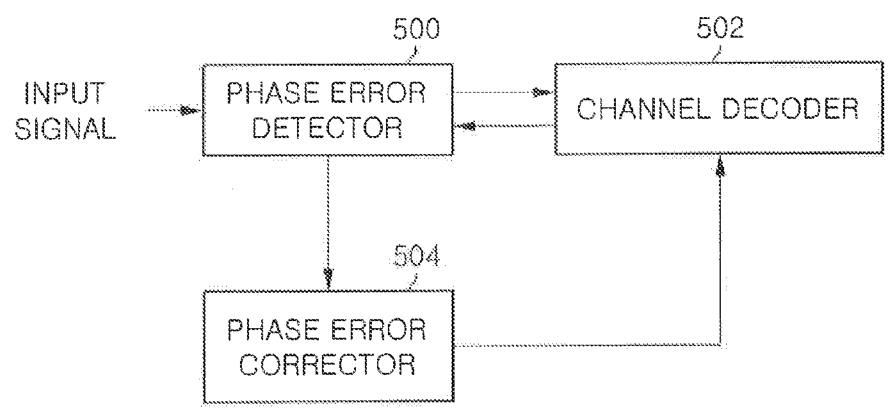
FIG. 5 is a block diagram of an iterative decoder for phase noise correction in accordance with the related art.

FIG. 5 is a block diagram of an iterative decoder for phase noise correction in accordance with another related art.

As illustrated in FIG. 5, an iterative decoder is designed to compensate for phase noise through the use of a phase error detector 500, a phase error corrector 504, and an iterative decoding-based channel decoder 502 such as a turbo decoder or an LDPC decoder. Since an accurate phase error value cannot be estimated due to an error of data for determining a phase noise error, the iterative decoder soft-decides a temporary log likelihood ratio (LLR) output value, which is output at every repeated number of times during an iterative decoding process, to detect a phase error and correct data. A single phase estimator has a low level of complexity but performance thereof is still degraded, so in most cases, multiple phase estimators are provided to improve a loss of performance. However, there is a problem in that the number of estimators is equally increased depending on the number of states of the iterative decoder.

Figures 1, 2:
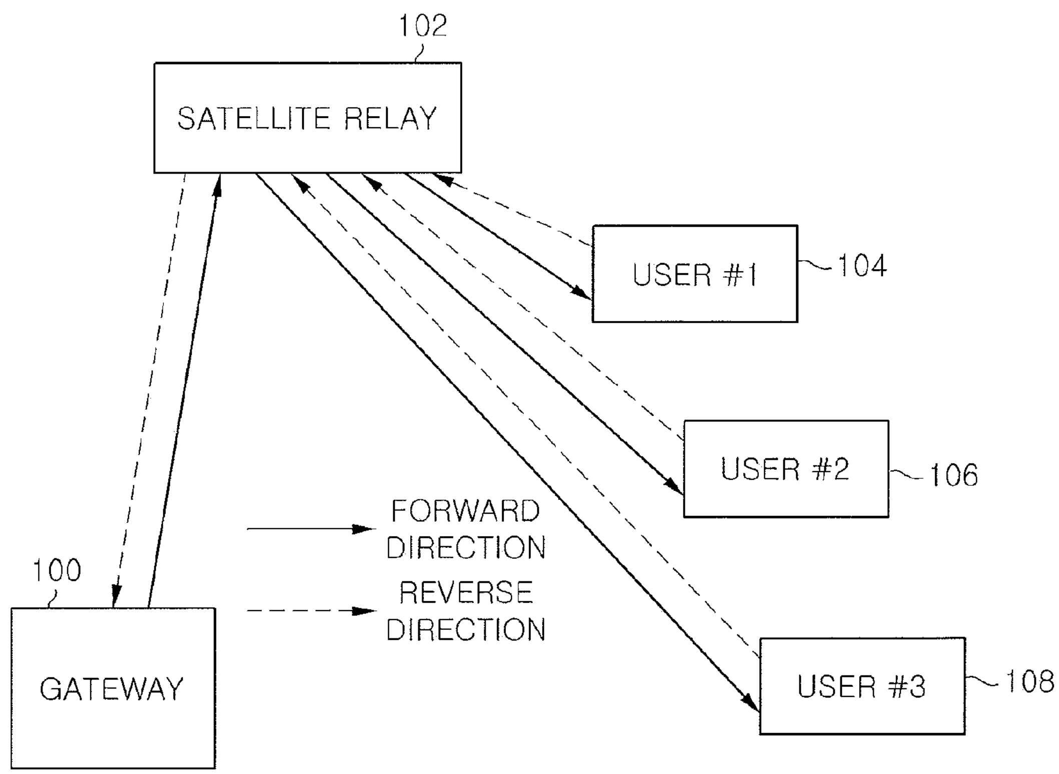
FIG. 1 illustrates a satellite broadcast communication network in accordance with the related art.
FIG. 2 is a view illustrating the structure of a packet for a data transmission.
Figure 3:
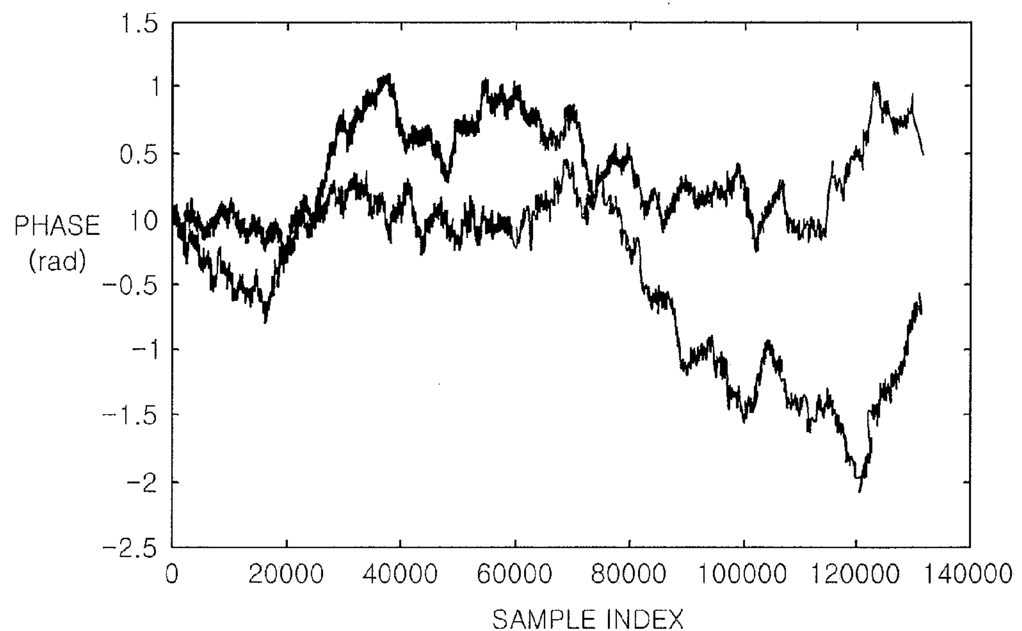
FIG. 3 is a graph showing phase noise expressed by time variable irregular random variable.

Still another related art is a BCJR-based phase nose estimating technique. A trace of an amount of phase variation is observed by probability distribution and made to a sector to compensate for phase noise. In case where data is basically transmitted as shown in the form of Fig, 6, a reception end can simply implement it. In configuring a packet, a pilot symbol is disposed in front of and behind the packet and one symbol 600 is inserted in a middle portion, and the length of the packet structure of FIG. 2 and that of a pilot symbol are equal on the whole, a loss is not made in terms of transmission efficiency.

Here, a value of a channel phase may be discriminated as a value of a region L as in Eq. (3) below:

$$\Theta = \left\{k\frac{2\pi}{L},\ 0 \le k < L\right\} \quad \text{Eq. (3)}$$

The probability distribution $\{\theta_t\}$ of the phase error is generally expressed in the form of a random walk as in Eq. (4) below, and $\Delta_t$ is a phase noise.

$$\theta_{t+1}=\theta_t+\Delta_t \quad \text{Eq. (4)}$$

Here, when it is assumed that there are L number of position states of a phase, transition of the phase may be expressed by a probability distribution model with L number of state trellises by Eq. (5) below:

$$p(k \to l) \approx p_\Delta\left((l-k)\frac{2\pi}{L}\right) \quad \text{Eq. (5)}$$

A distribution of a phase at time t may be expressed as a vector p of a length L.

Figure 6:
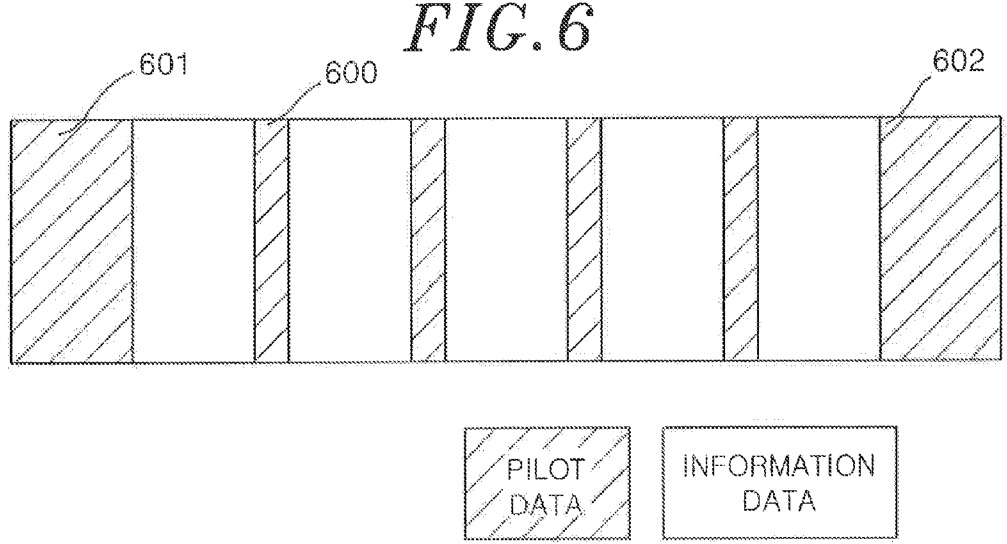
FIG. 6 illustrates a burst structure applied to an embodiment of the present invention.

Here, in case of a pilot disposition in which a preamble 601 and a postamble 602 exists as shown in FIG. 6, respective distributions correspond to $p_o$ and $p_{p-1}$. Given such probability distribution of a phase, a BCJR algorithm can be applied. Let a vector of a reception signal be $r_s^t$ $(r_s, \ldots, r_t)$ it may be expressed by Eq. (6) below:

$$\alpha_t(k) = P_r\left\{\theta = k\frac{2\pi}{L};\ r_0^{t-1}\right\}\beta_t(k) = P_r\left\{\theta = k\frac{2\pi}{L};\ r_{t+1}^{P-1}\right\} \quad \text{Eq. (6)}$$

Herein, since an initial phase and a last phase of a data symbol are known through a pilot symbol, a forward metric/backward metric of each phase can be expressed by Eq. (7) and Eq. (8) below:

$$\alpha_{t+1}(k)=\Sigma_n\alpha_t(n)p_t(n)p(n\to k)\alpha_0=1 \quad \text{Eq. (7)}$$

$$\beta_t(k)=\Sigma_n\beta_{t+1}(n)p_{t+1}(n)p(n\to k)\beta_{P-1}=1 \quad \text{Eq. (8)}$$

Figure 7:
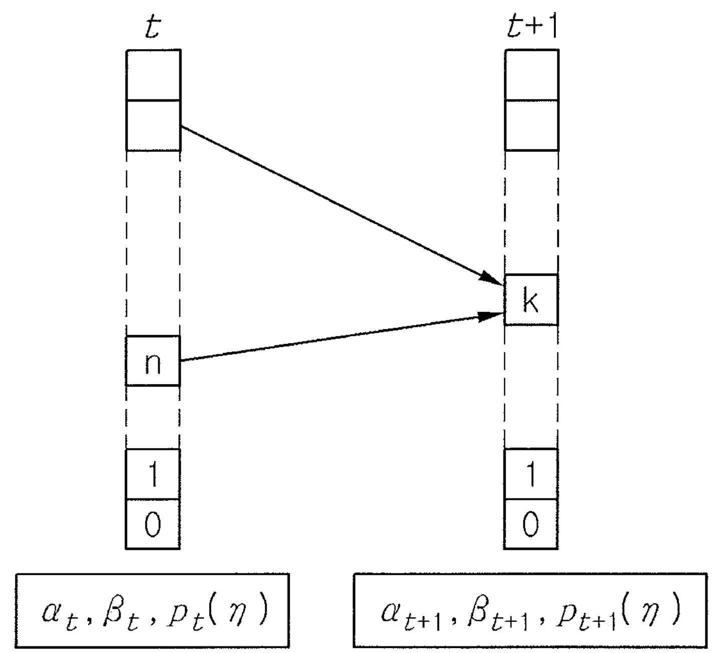
FIG. 7 illustrates a state transition diagram of a digital-quantized phase trellis.

These are the same as illustrated in FIG. 7.

At time t, the distribution of phases may be expressed by Eq. (9) below:

$$p_t(n) = P(\theta = n \mid r_t, \text{Code}) \propto \sum_{s\in C} p_{a,t}(s)\exp - \frac{|r_t e^{-j\theta_n} - s|^2}{2\sigma^2} \quad \text{Eq. (9)}$$

Herein, $p_{a,t}(s)$ is a prior probability of a symbol s at time t, and a channel LLR obtained by disregarding a symbol probability $p_t(s)$ is as shown in Eq. (10):

$$P_t(s) \propto p_{a,t}(s)\sum_n \alpha_t(n)\beta_t(n)\exp - \frac{|r_t e^{-j\theta_n} - s|^2}{2\sigma^2} \quad \text{Eq. (10)}$$

However, implementation of the foregoing techniques by hardware has complexity.

Figure 8:
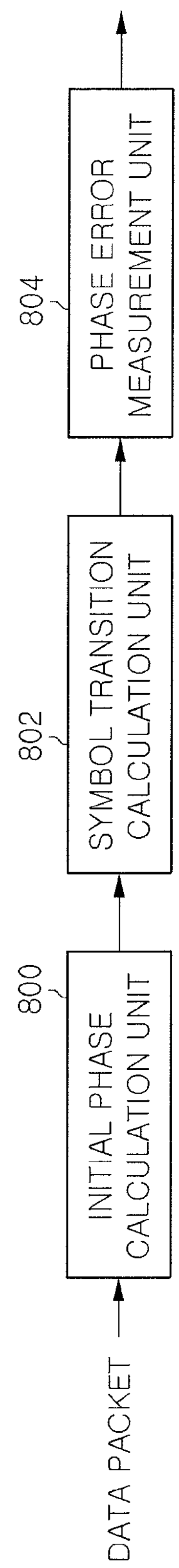
FIG. 8 is a block diagram of a transmission/reception apparatus for high efficiency satellite transmission in accordance with an embodiment of the present invention.

FIG. 8 illustrates a block diagram of a data transmission and reception apparatus for a high efficiency satellite transmission in accordance with an embodiment of the present invention. The data transmission and reception apparatus includes an initial phase calculation unit 800, a symbol transition calculation unit 802, and a phase error estimation unit 804.

The initial phase calculation unit 800 calculates phase information of a start point and that of an end point for an initial phase using a preamble and a postamble of a data packet provided thereto.

Phase information $a_{f,0}$ of the start point of the initial phase may be calculated as in Eq. (11) below:

$$a_{f,0} = \frac{\left(\sum_{k=0}^{L_{pre}-1} r_k p_k^*\right)}{\sigma_{AWGN}^2} \quad \text{Eq. (11)}$$

In Eq. (11), $r_k$ is data information of the reception data packet, $p_k$ is pilot information, and $\sigma^2_{AWGN}$ denotes noise information of a channel.

Also, phase information $a_{b,s}$ of the end point of the initial phase may be calculated as in Eq. (12) below:

$$a_{b,S} = \frac{\left(\sum_{k=0}^{L_{pre}-1} r_i(L-k) p_{L-k}^*\right)}{\sigma_{AWGN}^2} \quad \text{Eq. (12)}$$

In Eq. (12), $r_{L-k}$ is data information of the data packet, and $P_{L-k}$ is pilot information.

The symbol transition calculation unit 802 performs forward metric operation in a forward direction from the preamble of the data packet using the initial phase information of the data packet calculated by the initial phase calculation unit 800 and a pilot symbol existing in the data packet. Further, the symbol transition calculation unit 802 calculates new phase information of the data packet in the forward direction through the forward metric operation to calculate a symbol transition of the data packet.

Here, new phase information $\alpha'_k$ of the data packet may be calculated as in Eq. (13) below:

$$\alpha'_k = \alpha_{k-1} + \frac{2r_{k-1}\overline{c}_{k-1}^*}{2\sigma_{AWGN}^2}, \qquad \alpha_k = \frac{\alpha'_k}{1+\sigma_\Delta^2|\alpha'_k|} \quad \text{Eq. (13)}$$

where k=1, . . . , P

In Eq. (13), $\alpha_{k-1}$ is an initial phase, $r_{k-1}$ is data information of the reception data packet, and $c_{k-1}$ is codeword data.

The symbol transition calculation unit 802 performs a backward metric operation on the reception data packet together with the forward metric operation as mentioned above. More specifically, the symbol transition calculation unit 802 performs a backward metric operation in a backward direction from the postamble of the packet data, and calculates new phase information of the data packet in the backward direction through backward metric operation to calculate a symbol transition of the data packet.

Herein, the new phase information $\beta'_k$ of the data packet may be calculated as in Eq. (14) below:

$$\beta'_k = \beta_{k+1} + \frac{2r_{k+1}\overline{c}_{k+1}^*}{2\sigma_{AWGN}^2}, \qquad \beta_k = \frac{\beta'_k}{1+\sigma_\Delta^2|\beta'_k|} \quad \text{Eq. (14)}$$

where k=1, . . . , P

In Eq. (14), $\beta_{k+1}$ is an initial phase, $r_{k+1}$ is data information of the reception data packet, and $c_{k+1}$ is codeword data.

The phase error estimation unit 804 calculates a phase error using pilot symbols in spots where the pilot symbols repeatedly exist before and after the user data in the data packet, and provides information regarding the calculated phase error to the symbol transition calculation unit 802 so that the information regarding the calculated phase error can be applied in calculating a symbol transition of the data packet.

Figure 9:
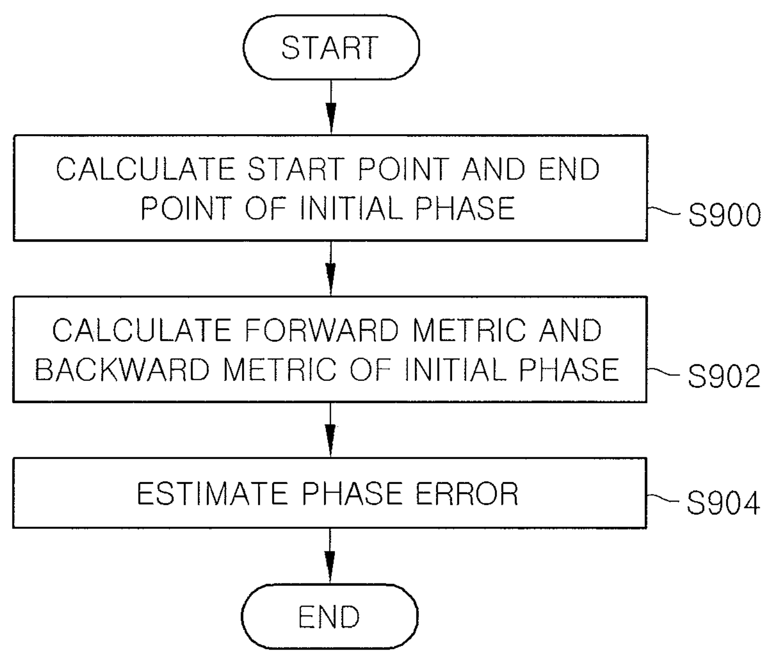
FIG. 9 is a flow chart illustrating a process of a data packet for high efficiency satellite transmission in accordance with an embodiment of the present invention.

FIG. 9 is a flow chart illustrating processing of data in the data transmission and reception apparatus for a high efficiency satellite transmission in accordance with an embodiment of the present invention.

First, a data packet is received through a satellite transmission or the like. The initial phase calculation unit 800 calculates phase information of a start point and that of an end point for the initial phase using a preamble and a postamble of the reception data packet in operation 900.

Next, the calculated phase information of the reception data packet is provided to the symbol transition calculation unit 802. The symbol transition calculation unit 802 then performs a forward metric operation in a forward direction from the preamble of the data packet using the initial phase information of the data packet calculated by the initial phase calculation unit 800 and the pilot symbol existing in the data packet, and calculates new phase information of the data packet in the forward direction through the forward metric operation, thereby calculating a symbol transition in operation S902.

In addition, in operation 902, the symbol transition calculation unit 802 performs a backward metric operation in a backward direction from the postamble of the reception data packet, and calculates new phase information of the reception data packet in the backward direction through the backward metric operation, thereby calculating a symbol transition of the data packet.

Subsequently, the phase error estimation unit 804 calculates a phase error using pilot symbols in spots where the pilot symbols repeatedly exist before and after the user data in the data packet, and provides information regarding the calculated phase error to the symbol transition calculation unit 802, so that the information regarding the calculated phase error can be applied when a symbol transition of the data packet is calculated in operation S904.

Figure 10:
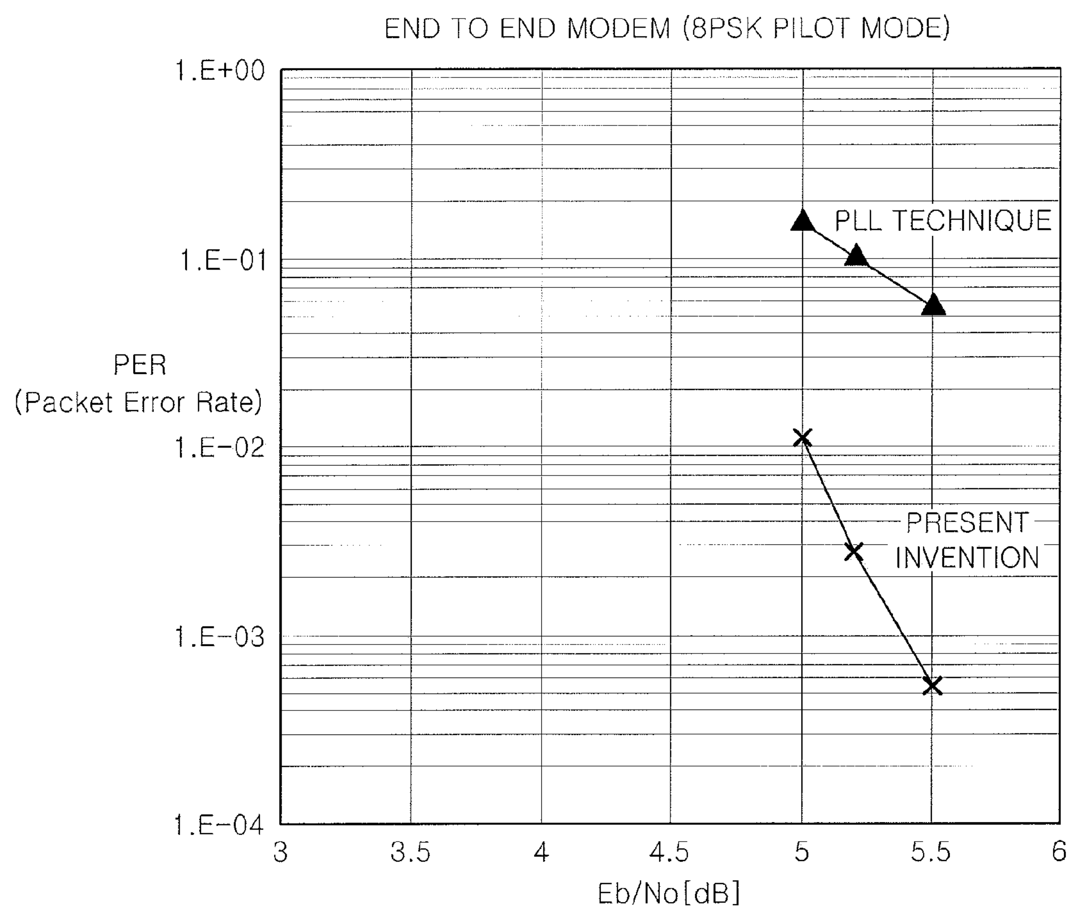
FIG. 10 is a graph showing a packet error rate (PER) in accordance with an embodiment of the present invention.

FIG. 10 is a graph showing a packet error rate (PER) in processing a data packet through the data transmission and reception apparatus for a high efficiency satellite transmission in accordance with an embodiment. As shown in the graph of FIG. 10, it can be seen that a packet error rate is further lowered when the data transmission and reception apparatus of the embodiment is applied, in comparison to the PLL technique of the related art.

As described above, in the embodiment, when a data packet is received in a TDM/TDMA type satellite transmission and access system, a start point and an end point of an initial phase are calculated using a preamble and a postamble and a forward metric and backward metric operation are performed on the initial phase using a pilot symbol to simply calculate a phase error so as to be robust against phase noise, thus improving the degradation of performance due to phase noise in the satellite communication/broadcast system. Further, phase noise is reduced by improved satellite error calculation, so that a reception end can more simply restore a signal.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A data transmission and reception apparatus for a high efficiency satellite transmission, the apparatus comprising:

an initial phase calculation unit configured to calculate initial phase information using a preamble and a postamble of a data packet applied thereto;

a symbol transition calculation unit configured to perform forward and backward metric operations using the initial phase information calculated by the initial phase calculation unit and a pilot symbol in the data packet to calculate a symbol transition of the data packet; and a phase error estimation unit configured to calculate a phase error using the pilot symbol existing in the data packet, the calculated phase error being provided to the symbol transition calculation unit.

2. The apparatus of claim 1, wherein the initial phase information is phase information of a start point and an end point of the initial phase of the data packet.

3. The apparatus of claim 2, wherein the initial phase calculation unit calculates phase information $a_{f,0}$ of the start point of the initial phase is calculated using the equation below:

$$a_{f,0} = \frac{\left(\sum_{k=0}^{L_{pre}-1} r_k p_k^*\right)}{\sigma_{AWGN}^2}$$

where $r_k$ $r_k$ is data information of the data packet, $P_k$ is pilot information, and $\sigma^2$ AWGN denotes noise information of a channel.

4. The apparatus of claim 2, wherein the initial phase calculation unit calculates phase information $a_{b,s}$ of the end point of the initial phase by the equation below:

$$a_{b,S} = \frac{\left(\sum_{k=0}^{L_{pre}-1} r_i(L-k) p_{L-k}^*\right)}{\sigma_{AWGN}^2}$$

where $r_{L-k}$ is data information of the reception data packet, and $P_{L-k}$ is pilot information, and $\sigma^2_{AWGN}$ denotes noise information of a channel.

5. The apparatus of claim 1, wherein the symbol transition calculation unit calculates the symbol transition of the data packet by calculating new phase information of the data packet in forward and backward directions through forward and backward metric operations.

6. The apparatus of claim 5, wherein the symbol transition calculation unit calculates new phase information a $'_k$ of the reception data packet in the forward direction by using the equation below:

$$\alpha_k' = \alpha_{k-1} + \frac{2r_{k-1}\overline{c}_{k-1}^*}{2\sigma_{AWGN}^2},$$

$$\alpha_k = \frac{\alpha_k'}{1 + \sigma_\Delta^2 |\alpha_k'|}$$

where k=1, . . . , P where $\alpha_{k-1}$ is an initial phase, $r_{k-1}$ is data information of the reception data packet, and $c_{k-1}$ is codeword data.

7. The apparatus of claim 5, wherein the symbol transition calculation unit calculates the new phase information $\beta'_k$ of the reception data packet in the backward direction by using the equation below:

$$\beta_k' = \beta_{k+1} + \frac{2r_{k+1}\overline{c}_{k+1}^*}{2\sigma_{AWGN}^2},$$

$$\beta_k = \frac{\beta_k'}{1 + \sigma_\Delta^2 |\beta_k'|}$$

where k=1, . . . , P where $\beta_{k+1}$ is an initial phase, $r_{k+l}$ is data information of the reception data packet, and $c_{k+1}$ is codeword data.

8. A data transmission/reception method for a high efficiency satellite transmission, the method comprising:

calculating initial phase information using a preamble and a postamble of a data packet;

performing forward and backward metric operations using the initial phase information and a pilot symbol of the data packet; and calculating a symbol transition of the data packet through the forward and backward metric operations.

9. The method of claim 8, wherein said performing forward and backward metric operations comprises calculating a phase error using the pilot symbol existing in the data packet.

10. The method of claim 8, wherein the initial phase information is phase information of a start point and an end point of the initial phase of the data packet.

11. The method of claim 10, wherein the phase information $a_{f,0}$ of the start point of the initial phase is calculated as follows:

$$a_{f,0} = \frac{\left(\sum_{k=0}^{L_{pre}-1} r_k p_k^*\right)}{\sigma_{AWGN}^2}$$

where $r_k$ is data information of the reception data packet, $p_k$ is pilot information, and $\sigma^2_{AWGN}$ denotes noise information of a channel.

12. The method of claim 10, wherein the phase information $a_{b,s}$ of the end point of the initial phase is calculated as follows:

$$a_{b,S} = \frac{\left(\sum_{k=0}^{L_{pre}-1} r_i(L-k) p_{L-k}^*\right)}{\sigma_{AWGN}^2}$$

where $r_{L-k}$ is data information of the reception data packet, $p_{L-k}$ is pilot information, and $\sigma^2_{AWGN}$ denotes noise information of a channel, 13. The method of claim 8, wherein said calculating a symbol transition comprises calculating the symbol transition of the reception data packet by calculating new phase information of the reception data packet in forward and backward directions through forward and backward metric operations.

14. The method of claim 13, wherein the new phase information $\alpha'_k$ of the reception data packet in the forward direction is calculated as follows:

$$\alpha'_k = \alpha_{k-1} + \frac{2r_{k-1}\overline{c}^*_{k-1}}{2\sigma^2_{AWGN}},$$

$$\alpha_k = \frac{\alpha'_k}{1+\sigma^2_\Delta|\alpha'_k|}$$

where k =1, . . . , P where $\alpha_{k-1}$ is an initial phase, $r_{k-1}$ is data information of the reception data packet, and $c_{k-1}$ is codeword data.

15. The method of claim 13, wherein the new phase information $\beta'_k$ of the reception data packet in the backward direction is calculated by using the equation below:

$$\beta'_k = \beta_{k+1} + \frac{2r_{k+1}\overline{c}^*_{k+1}}{2\sigma^2_{AWGN}},$$

$$\beta_k = \frac{\beta'_k}{1+\sigma^2_\Delta|\beta'_k|}$$

where k=1, . . . , p where $\beta_{k+1}$ is an initial phase, $r_{k+1}$ is data information of the reception data packet, and $c_{k+1}$ is codeword data.

* * * * *